United States Patent [19]

Nemeh et al.

[11] Patent Number: 4,772,332
[45] Date of Patent: Sep. 20, 1988

[54] USE OF MIXTURE OF HIGH MOLECULAR WEIGHT SULFONATES AS AUXILIARY DISPERSANT FOR STRUCTURED KAOLINS

[75] Inventors: Saad Nemeh, Long Branch; Paul Sennett, Colonia; Richard A. Slepetys, Brick, all of N.J.

[73] Assignee: Engelhard Corporation, Menlo Park, N.J.

[21] Appl. No.: 147,400

[22] Filed: Jan. 25, 1988

Related U.S. Application Data

[63] Continuation-in-part of Ser. No. 40,918, Apr. 20, 1987.

[51] Int. Cl.$^4$ .......................... C08J 7/12; C09C 3/06; C09J 3/06; C04B 33/04
[52] U.S. Cl. .................... 106/487; 106/214; 106/505; 106/503; 501/146
[58] Field of Search ................... 501/146; 106/308 S, 106/288 B, 214

[56] References Cited

U.S. PATENT DOCUMENTS

| | | | |
|---|---|---|---|
| 3,519,454 | 7/1970 | Sawyer, Jr. et al. | 106/288 B |
| 3,594,203 | 7/1971 | Sawyer, Jr. et al. | 106/288 B |
| 3,736,165 | 5/1973 | Sawyer, Jr. | 106/288 B |
| 4,106,949 | 8/1978 | Malden | 106/288 B |
| 4,174,279 | 11/1979 | Clark et al. | 106/288 B |
| 4,272,297 | 6/1981 | Brooks et al. | 106/214 |

*Primary Examiner*—Paul Lieberman
*Assistant Examiner*—Helene Kirschner
*Attorney, Agent, or Firm*—Inez L. Moselle

[57] ABSTRACT

A heat stabilized slurry of bulked kaolin pigment is prepared by mixing a small but effective amount of a water-soluble cationic material such as a cationic polyelectrolyte flocculant with a kaolin clay pigment in the presence of water. The resultant bulked clay product is dispersed to form a high solids clay-water slurry useful in making aqueous coating colors suitable for manufacturing lightweight coated publication papers or the pigment can be used as a filler for paper webs. Slurries having stable viscosity during storage at elevated temperature and improved resistance to the formation of sediment are prepared by using as the dispersant a combination of an anionic lignosulfonate and an anionic naphthalene sulfonate formaldehyde complex in combination with a polyacrylate salt.

10 Claims, No Drawings

USE OF MIXTURE OF HIGH MOLECULAR WEIGHT SULFONATES AS AUXILIARY DISPERSANT FOR STRUCTURED KAOLINS

RELATED APPLICATIONS

This is a continuation in part of U.S. Ser. No. 07/040,918, filed Apr. 20, 1987. The subject matter is related to the subject matter described in U.S. Ser. No. 861,943, dated May 12, 1986, and U.S. Ser. No. 06/908,439 filed Sept. 16, 1986.

FIELD OF THE INVENTION

This invention relates to improving the properties of pigments obtained by bulking kaolin clay by addition to the clay of a cationic material such as a polyamine or a quaternary ammonium polyelectrolyte. More specifically, the invention relates to remedying problems encountered when aqueous slurries containing such bulked pigments are stored or exposed to high temperature during storage, shipment, or use, for example when the slurries are prepared into coating colors in a steam jet cooker or when slurries are shipped and stored under high ambient temperatures.

BACKGROUND OF THE INVENTION

Finely divided refined kaolin clay is widely used as a pigment to provide a glossy, white opaque surface finish on printing paper. The processing of refined kaolin pigments necessitates particle size fractionation and purifying crude clay while the clay is in the form of a fluid deflocculated aqueous slurry, bleaching the clay while in a flocculated state, filtering the flocculated clay to remove liquid water and then dispersing the flocculated clay in water to form a high solids slurry that is marketed as such or is dried, usually in a spray dryer, to provide a dry refined pigment capable of being mixed with water to form a dispersed fluid suspension. The latter form of clay is frequently referred to as a "predispersed" grade of clay even though the clay is dry and is not present in dispersed state until it is mixed with water.

Conventional kaolin clay pigments are applied onto paper sheets as aqueous "coating colors," which comprise a clay pigment, a dispersing agent for the clay, a suitable adhesive such as a polymer latex, starch, or mixtures thereof and other minor additives. Present-day coatings are applied at high machine speeds where the use of high solids coating colors is desirable. The formulation of coating colors at high solids requires the initial provision of fluid high solids suspensions or conventional "slips". These suspensions are subsequently mixed with adhesive dispersions or suspensions to prepare the coating colors. High solids suspensions of conventional hydrous (uncalcined) clays generally contain in excess of 65% clay solids (65 parts by weight dry clay to 35 parts by weight water). Typically, solids are about 70%. A dispersing (deflocculating) agent, conventionally a sodium condensed phosphate salt, or sodium polyacrylate, is present in the high solids suspensions of conventional coating clays in order to impart fluidity, since the systems do not flow in the absence of the dispersing agent.

Such kaolin clay pigments must meet certain requirements with regard to rheological properties and to the properties of the coated sheet material. The viscosity of the high solids suspension of the clay coating pigment must be sufficiently low to permit mixing and pumping. After the adhesive is incorporated, the resulting coating color must also have suitable viscosity for handling and application to the paper sheet. In addition, it is highly desirable to obtain a coated calendered sheet which has good opacity, gloss, brightness and printability.

It is conventional practice in the art to improve the opacifying or hiding power of coating colors by blending the clay pigments with more costly pigments having greater opacifying power, such as $TiO_2$. The industry has long sought a kaolin clay pigment which imparts improved opacifying power to coated paper without sacrificing gloss and printability and which can preferably be used in the absence of other more expensive pigments.

High bulking clay pigments offer the opportunity of maintaining or improving the opacity, gloss and printability of coated paper at lower coating weights, thereby reducing the pigment cost for coating colors. Bulking pigments are those which provide coatings having high opacification at a low coat weight. Generally, bulking is achieved by introducing voids in a pigment structure which contribute to increased light scatter. Controlled calcination of kaolin clays results in one type of bulking clay pigment. Calcined bulked kaolin clay such as the material supplied under the registered trademark ANSILEX have enjoyed widespread commercial success for more than a decade. For many years attempts have been made to bulk hydrous kaolin clays, thereby avoiding the expense involved in calcining clay and also avoiding the increase in pigment abrasivity that appears to be an inherent result of calcination. U.S. Pat. Nos. 4,075,030; 4,076,548 and 4,078,941 teach procedures for increasing the opacifying power of hydrous kaolin clays by "selectively flocculating" ultrafine clay particles with a low molecular weight polyamine flocculating agent (e.g., ethylene diamine or hexamethylene diamine) or with long carbon chain amines or certain quaternary ammonium salts (e.g., "ditallowdimethyl" ammonium chloride) in the presence of a mineral acid flocculating agent, e.g., sulfuric acid, and optionally with the added presence of citric acid or mica or both. The selective flocculation treatment allegedly incorporates voids in the clay to form a low density, high bulking pigment which when used as a coating color pigment improves the opacity of paper coated therewith. U.S. Pat. No. 4,640,716 teaches the use of certain zirconium compounds such as zirconium ammonium carbonate to bulk clay.

Efforts to introduce bulking pigments to the paper industry have been thwarted by the poor rheology of slurries of these pigments. Generally, paper makers seek to use clay coating pigments capable of forming high solids clay-water slurries which have a low shear viscosity below 1000 cp, preferably below 500 cp, when measured by the Brookfield viscometer at 20 r.p.m.. High shear viscosity for these slurries should be such that they are no more viscous than a slurry having a Hercules endpoint viscosity of 500 r.p.m., preferably 800 r.p.m., using the "A" bob at $16 \times 10^5$ dyne-cm. Those skilled in the art are aware that when using the Hercules viscometer and measuring endpoints of 1100 r.p.m. or higher, endpoint viscosities are reported in units of dyne-cm at 1100 r.p.m.; apparent viscosity increases as the value for dyne-cm increases. It is conventional to use the abbreviated term 'dyne". Thus, a "2 dyne" clay slurry is less viscous than a "9 dyne clay" slurry. As used hereinafter the expressions 500 r.p.m. or higher, or 800 r.p.m. or higher, are intended to include lower viscosities such that endpoint measurements are at 1100 r.p.m. and the values are reported as dynes.

Another problem encountered in the successful commercialization of bulking pigments obtained from kaolin clay has been the difficulty of producing a bulked structure that is sufficiently durable to survive during various stages of production and end-use and is also capable of being dispersed to form high solids clay-water slurries having acceptable viscosity. When the general wet processing scheme described above is employed to make bulked structures by adding a bulking agent before filtration, the bulked structure must still be present in the filter cake containing the bulked assemblages when the filter cake is "made down" into a fluid slurry. The expressions "make down" and "made down" are conventional in the industry and refer to the preparation of dispersed pigment-water slurries. In some cases, it may be necessary to apply mechanical work to the filter cake to reduce the viscosity to usable values. The bulked structure must be sufficiently tenacious to survive the mechanical forces during such treatment. Bulking pigments must also be sufficiently stable under the influence of shear to maintain the bulked structure under the high shear rates, such as the high shear rates encountered in pumping high solids clay water slurries in centrifugal pumps. Moreover, a bulked structure must be capable of being retained when the deflocculated clay water slurry is formed into a coating color using standard makedown equipment. Also, the bulked structure must survive during the coating application and subsequent calendering. The fragility of the bulked structures obtained by prior art chemical treatments of hydrous clay has limited their commercial use. As mentioned, commercial bulking clays heretofore used by the paper industry have been those prepared by calcining fine particle size hydrous clays. In such case, calcination "sets" the bulked structure such that it is sufficiently durable to survive manufacturing, handling and use. Generally, a criterion for durability of a bulked structure is the retention of improved opacification after the above-described handling.

Copending patent application, Ser. No. 861,943, filed May 12, 1986, provides new relatively inexpensive kaolin pigments with a stable bulked structure but also capable of being mixed with water and dispersants to form clay-water slurries and coating colors having usable low and high shear viscosity. Although aqueous suspensions of such bulked clay contain added deflocculant to increase fluidity, these suspensions are not truly in a fully deflocculated or dispersed condition because the bulked, flocced structure is retained. Thus, these slurries can be termed "partially deflocculated" or "partially dispersed" slurries or suspensions. The new bulked pigments, obtained using high charge density cationic polyelectrolytes to bulk the clay, can be applied to paper at low cost weights. Coated printing paper possessing superior printability, especially by rotogravure and offset methods, has been obtained. However, slurries of the improved bulked pigments tend to increase in viscosity when exposed to high temperature, for example when prepared into starch coating colors by the known steam jet cooking procedure. Similarly, viscosity may increase slowly upon exposure to elevated storage temperature (e.g. 100° F.) over a period of several weeks. For example, when a bulked pigment obtained by treating kaolin clay with cationic quaternary ammonium polymer (Calgon 261 LV) is dispersed in water with a polyacrylate or polyphosphate dispersant, as described in Ser. No. 861,943, and the "dispersed" aqueous slurry is heated, the clay-water slurry thickens at about 60° C. This occurs when such dispersants are either added to the washed filter cake obtained during processing or if the dispersants are added to previously spray dried bulked clay. It has also been found that slurries prepared by adding dispersant to conventionally washed (cold water) filter cakes of the new bulked pigments should be spray dried without aging the slurries for more than one or two days because high and low shear viscosity of spray dried pigments are adversely affected. When a hot wash is used, slurries can be aged for longer times, e.g., two weeks or longer without detriment to the viscosity of the pigment. By using a hot wash, pigments can be shipped in slurry form without an intermediate drying step. Such washing is not always feasible.

It is desirable to be able to ship high solids slurries of pigments in tank cars. A high degree of fluidity is required. In many instances, slurry shipments must be sufficiently fluid to flow out of tank cars under the influence of gravity alone. Such phenomena as thickening, gel formation and sedimentation are undesirable because they impair or prevent gravity flow.

It has been observed that the viscosity increase of fluidized slurries of cationically bulked kaolin slurries is at least partially due to the formation of a thixotropic gel. It has now been found that storage also may result in the formation of a sediment in the fluidized slurry of bulked clay. Gel and sediment formation are especially likely to occur when storage takes place at elevated temperatures. If the slurry is stirred, the gel breaks down and the slurry may have a low viscosity and flow freely. Nevertheless, the possibility of using gravity alone to unload tank cars is not certain.

Copending applications U.S. Ser. No. 06/908,439 and 07/040,918 address the problem of maintaining low viscosity of bulked kaolin pigments on storage, elevating the thermal thickening temperature, providing lower viscosity in hard water and reducing the viscosity of slurries in the presence of starch such as to permit steam jet cooking.

U.S. Ser. No. 06/908,439 teaches the use of a nonionic surfactant with a polyacrylate dispersant to solve some of these problems. U.S. Ser. No. 07/040,918 teaches the use of a relatively high molecular weight sulfonates, preferably with a polyacrylate dispersant for such purpose. Lignin sulfonates and naphthalene sulfonate formaldehyde complexes are disclosed as suitable sulfonates. The sulfonates were found to be more effective than nonionics in maintaining low coating color viscosities.

Sulfonates are known to be useful as auxiliary dipersants when used with polyphosphates (condensed phosphates). It is also well known that polyphosphates tend to revert as a result of hydrolysis to form phosphates that are not effective dispersants. This hydrolysis is accelerated by increase of temperature. Sulfonates have been used with polyphosphates to remedy this problem. See U.S. Pat. Nos. 3,341,340, 3,594,203, 3,519,454 and 3,736,165, Sawyer Jr. et al, and also U.S. Pat. No. 2,709,661 (Dietz), U.S. Pat. No. 3,130,063, Millman et al) and J. R. Hern and J. H. Fritz, "Auxiliary Dispersants for Pigments and Pigmented Coatings," TAPPI, December 1966, Vol. 49, No. 12, 77-88A.

The discovery that the use of nonionic surfactants or sulfonates along with a polyacrylate dispersant to fluidize slurries of bulked pigments overcomes problems previously recognized as being an obstacle to the commercial supply of bulked kaolin pigments in slurry form. A new problem has now surfaced. This problem results from the increased fluidity of slurries at the desired 62% shipping solids when using sulfonates to improve the thermal properties of slurries of pigments bulked with cationic polyelectrolyte and fluidized with a polyacrylate dispersant. Thus, appreciable settling of solids takes place when using a sulfonate with a polyacrylate dispersant.

A conventional approach to overcome settling of pigment slurries is simply to increase the solids contents of the slurries. This approach was not successful with slurries of chemically bulked kaolin pigments because increases in bulked pigments solids resulted in undesirable decreases in opacification. Furthermore, the tendency of pigment slurries to thicken or gel upon storage at elevated temperatures increased at these higher solids contents. It is known that colloidal thickening agents can retard or prevent sedimentation of dispersed slurries of coarse particle size kaolin slurries. See, for example, U.S. Pat. No. 3,130,063 to N. Millman et al. Thickening agents disclosed in this patent are high molecular weight organic carbohydrates which swell or dissolve in water. Listed agents are swollen starches, soaps, cellulose derivatives, karaya gum, guar gum, distearyl dimetlhy ammonium chloride, sodium polyacrylate and sodium alginate.

THE INVENTION

The present invention provides means for improving the properties of high solids fluidized slurries of a specific type of kaolin clay pigment, namely kaolin clay pigments bulked by flocculating hydrous kaolin clay with a water soluble cationic material such as a polyamine or a quaternary ammonium polyelectrolyte, such that fluidized slurries of the pigments or coating pigments prepared from such slurries have both improved stability and viscosity stability at elevated temperatures, but are also less prone to form a sediment during storage.

In accordance with the present invention, the dispersant used to fluidize high solids slurries of cationically bulked clay is a combination of at least one polyacrylate salt, at least one anionic water-soluble naphthalene sulfonate formaldelyde complex and at least one anionic water-soluble lignosulfonate. Aqueous pigment slurries of bulked pigments of the invention can be stored for an extended period of time even at elevated temperature, e.g., 18 days at 140° F., without undue viscosity increase and with a minimal sedimentation while still being capable of producing coated paper having acceptable printability. The mixture of polyacrylate and combination of sulfonates is preferably employed in an amount effective to provide slurries of bulked kaolin having optimum viscosity. It has been found that in order to obtain the desirable combination of benefits, namely improved viscosity stability on storage, minimized sensitivity to the presence of soluble salts in slurries and coating colors, and the ability of slurries and coating colors to resist thickening when heated, two different species of a water soluble sulfonate must be used in combination with a polyacrylate salt dispersant. The sulfonates used in the practice of this invention are those which are effective in dispersing slurries of bulked clay pigments even in the absence of polyacrylate dispersants.

The resulting three component dispersant system results in high solids slurries of bulking pigments that are more stable during storage than are slurries of the same solids content, but dispersed with polyacrylate alone, lignin sulfonate alone, naphthalene sulfonate formaldehyde complex alone, or combination of polyacrylate with either of the two sulfonates alone. More specifically, there is less settling during storage. This is demonstrated by data in illustrative examples. Also, limited testing indicates that when polyacrylate is used with the combination of sulfonates, coating color viscosity is less than when either sulfonate is used alone with polyacrylate and printability is not impaired.

In one embodiment of the invention, the stabilized slurries also contain a xanthan gum thickening agent.

The polyacrylate and anionic sulfonate dispersants may be added serially or in various admixtures to cationically bulked kaolin clay be modification of the procedures described in Ser. No. 861,943 such that the dispersants are added when the filter cake is reslurried. Alternatively, the sulfonates can be added serially or in admixture to spray dried bulked clay.

When the three component dispersant mixture of the invention is added to a filter cake obtained by bulking kaolin clay with a cationic polyelectrolyte to fluidize the clay and form a slurry, the heat resisitivity of the slurry increases markedly withh a minimal effect on the performance properties of the bulked clay pigment or the viscosity of the clay water slurry. Similar resistivity improvements in heat stability are obtained if the slurry containing the added three component system is spray dried and then redispersed in water. Gelation is also minimized or avoided.

Preferably, the total amount of dispersant (sulfonate combined with polyacrylate) is such as to prepare a slurry having a solids content of at least 60% and having "minimum" Brookfield (low shear) viscosity, at 20 r.p.m. A procedure for determining minimum viscosity is described hereinafter.

The total amount in of dispersant is not narrowly critical and can range from about 0.15% to 0.50% by weight based on the dry weight of the bulked clay, and is preferably in the range of about 0.30% to 0.35% by weight. When too much dispersant is used, the viscosity of the slurry increases; when insufficient dispersant is employed, viscosity of the slurry increases and storage stability is impaired.

Satisfactory results have been obtained with individual dispersants used in the following amounts (all on a weight percentage based on the dry weight of the flocculated clay).

|  | Polyacrylate | Lignin Sulfonate | Naphthelene Sulfonate Formaldehyde Complex |
| --- | --- | --- | --- |
| Minimum | 0.05 | 0.05 | 0.05 |
| Maximum | 0.20 | 0.15 | 0.15 |

The use of an excessive amount of lignin sulfonate can decrease pigment brightness. The use of an excessive amount of napthalene sulfonate formaldehyde complex would be expected to impair printability. Use of an excessive amount of mixture of sulfonate will necessitate a reduction in the amount of polyacrylate need to produce a stable slurry of minimum viscosity.

DETAILED DESCRIPTION

Preparation of Preferred Bulked Pigments (Ser. No. 861,943).

It has been determined that the shape of the particle size distribution curve of the kaolin clay used to produce pigments of the invention has an effect on the ultimate coating properties of the polyelectrolyte treated kaolin clay mineral. Thus, a clay having the following particle size distribution characteristics has been found to provide minimum viscosity and good coating properties: a median particle size of 0.55 micrometers and a particle size distribution such that about $88\pm3\%$ of the particles have an equivalent spherical diameter less than about 2 micrometers and not more than about 25% by weight, preferably not more than about 20% by weight, have an equivalent spherical diameter less than 0.3 micrometers. If the particle size is too coarse, gloss and opacity suffer although opacity will be greater than that obtained with the clay before treatment with polyelectrolyte. If the quantity of ultrafine particles, i.e., particles 0.3 micrometers and finer, is too great, the print quality of paper coated with such pigment is impaired and the viscosity of slurries of the pigment may be such that the product has limited, if any, use.

In order to achieve the desired particle size distribution of the kaolin that is eventually formed into a bulked structure, it is generally necessary to perform one or more particle size separations on the crude clay. Generally, such processing includes degritting, followed by differential gravitational or centrifugal sedimentation to recover a size fraction of desired particle size, such as for example, a fraction that is 90% by weight finer than 2 micrometers and does not contain an excessive amount of ultrafine particles. The content of ultrafines and median (weight) particle size of such fraction will vary, depending on the particle size distribution of the crude clay. In order to perform these operations successfully, it is essential that the clay be present in the form of discrete particles in water rather than flocs so that the particles can be accurately separated into different size ranges. The clay particles are therefore treated with a deflocculant (dispersing agent) which will give all the particles a negative electric charge, and cause them to repel each other when the particles are suspended in water. The clay dispersant used at this stage is generally referred to as a "primary" dispersant. Dispersants used to deflocculate suspensions of previously processed clay (such as dispersants added to filter cakes) are termed "secondary" dispersants or deflocculants. Suitable dispersing agents used for primary dispersion in practice of the present invention are conventional and include water soluble salts of condensed phosphate, such as tetrasodium pyrophosphate, sodium silicate, or a water soluble organic polymeric dispersing agent, for example, a polyacrylate. The amount of primary dispersing agent used will generally be in the range of from about 0.025 to 0.2% by weight based on the weight of the dry clay. Generally, particle size separations are performed using deflocculated aqueous suspensions having a solids content of about 20-40% by weight. Other solids levels may be used to carry out such separations. The median particle size of the clay particles that are treated with the cationic polyelectrolyte should range from 0.4 to 0.7 micrometers, equivalent spherical diameter (e.s.d), preferably 0.5 to 0.6 micrometers, as determined by conventional sedimentation techniques using the SEDIGRAPH ® particle size analyzer, supplied by Micromeritics, Inc. From about 80% to 95% by weight of the particles should be finer than 2 micrometers, e.s.d. The content of fines below 0.3 micrometer e.s.d should be below 35 weight percent, preferably below 25 weight percent, and most preferably 20 weight percent or below. It should be understood that the measurements of the size of clay particles that are 0.3 micrometer or finer are of limited reproducibility. Thus, when a SEDIGRAPH analyzer is employed, the value for weight percent may be $\pm5\%$ when tested by another operator or a different SEDIGRAPH analyzer is employed. Most preferably, median particle size is $0.6\pm0.05$ micrometers, e.s.d, with 85 to 90% by weight of the particles finer than 2 micrometers, e.s.d, and less than about 20% by weight or less finer than 0.30 micrometers, e.s.d. Present experience indicates that when the clay to which polyelectrolyte is added contains an excessive amount of ultrafine particles (particles 0.3 micrometers or finer), the Brookfield viscosity may be higher than and Hercules viscosity lower than that of slurries of bulked pigments obtained from clays with a smaller amount of ultrafine particles. One trial resulted in a failure because of excessively high low shear viscosity of the product when the feed clay contained more than the desired amount of particles finer than 0.3 micrometers. Blending of clay fractions may be advantageous or necessary with some crudes to provide a clay feed having a desirable particle size distribution.

The amount of polyelectrolyte employed is carefully controlled to be sufficient to improve the opacity of the clay as a result of forming a bulked (aggregated) structure in which the aggregates are sufficiently strong to survive mechanical forces exerted during manufacture and end use but is carefully limited so as to assure than the product can be formed into a clay-water slurry that has a solids content of 60% or higher, which slurry has acceptable viscosity.

The amount of the cationic polyelectrolyte salt used to treat the kaolin clay may vary with characteristics of the polyelectrolyte including charge density of the polyelectrolyte, the particle size distribution of the clay and solids content of the clay slurry to which the polyelectrolyte is added. Using the presently preferred dimethyldiallyl ammonium salt polyelectrolyte with clay having a median size in the range of about 0.5 to 0.6 micrometers, and having less than 20% finer than 0.3 micrometers and adding polyelectrolyte to a previously deflocculated clay-water suspension having a clay solids content of about 20-40% by weight, useful amounts range from about 0.03 to about 0.15% by weight of the moisture free weight of the clay, most preferably about 0.07 to about 0.10% by weight. When insufficient polyelectrolyte is used, the effect on opacity and printability in coating applications may be less than desired. On the other hand, an excessive amount of the polyelectrolyte may impair other desired properties for the clay, especially rheology.

The polyelectrolyte, which is water soluble, is added to the slurry as a dilute aqueous solution, e.g., 0.25-2.0% concentration on a weight basis, with agitation to achieve good distribution in the slurry. Ambient temperature can be used. It may be advantageous to heat the slurry of clay, solution of polyelectrolyte, or both to about 150° to 180° F. The cationic polyelectrolyte flocculants that are used have closely spaced charged centers and therefore represent high charge density material. Because of this, the reaction with the clay mineral is extremely rapid and appears to be complete in a relatively short time. While not wishing to be limited by any particulars of the reaction mechanisms, it is believed that the clay mineral cations such as $H^+$, $Na^+$, and $Ca^{++}$ are replaced with the positively charged polymeric portion of the cationic polyelectrolyte at the original mineral cation location and that this replacement reduces the negative charge on the clay particles which in turn leads to coalescence by mutual attraction. Charge center near the end of the polymer chain react and bridge with neighboring particles until the accessible clay cation exchange centers or the polymer charge centers are exhausted. The bridging strengthens the bond between the particles, thereby providing a highly shear resistant, bulked clay mineral composition. The amount of polyelectrolyte added is less than that calculated to provide a monolayer on the surface of clay particles. Present experience based on measurements of particle charge by electrophoretic mobility indicates that the bulked clay does not have a cationic charge.

Water soluble cationic polyelectrolyte flocculants are well known in the art and many are known to increase the rate at which clay slurries filter. See, for example, U.S. Pat. No. 4,174,279. Cationic polyelectrolyte flocculants are characterized by a high density of positive charge. Positive charge density is calculated by dividing the total number of positive charges per molecule by the molecular weight. Generally the high charge density of polyelectrolyte flocculants exceeds $1 \times 10^{-3}$ and such materials do not contain negative groups such as carboxyl or carbonyl groups. In addition to the alkyl diallyl quaternary ammonium salts, other quaternary ammonium cationic flocculants are obtained by copolymerizing aliphatic secondary amines with epichlorohydrin. See U.S. Pat. No. 4,174,279. Still other water-soluble cationic polyelectrolytes are poly(quaternary ammonium)polyether salts that contain quaternary nitrogen in a polymeric backbone and are chain extended by ether groups. They are prepared from water-soluble poly(quaternary ammonium salts) containing pendant hydroxyl groups and bifunctionally reactive chain extending agents; such polyelectrolytes are prepared by treating an N, N, $N^{(1)}$, $N^{(1)}$ tetraalkylhydroxyalkylenediamine and an organic dihalide such as a dihydroalkane or a dihaloether with an epoxy haloalkane. Such polyelectrolytes and their use in flocculating clay are disclosed in U.S. Pat. No. 3,663,461. Other water soluble cationic polyelectrolyte flocculants are polyamines. Polyamine flocculants are usually supplied commercially under trade designations; chemical structure and molecular weight are not provided by the suppliers.

A dimethyl diallyl quaternary ammonium chloride polymer commercially available under the trademark designation Polymer 261 LV from the Calgon Corporation having a molecular weight estimated to be between 50,000–250,000 has been found particularly useful in the practice of the present invention. However, the invention is not limited to Polymer 261 LV since other cationic flocculants appear to provide equivalent, if not superior results.

Limited experimental work with kaolin clay that produced desired results using 0.08% Calgon 261 LV polymer (dimethyl diallyl ammonium chloride, said by the supplier to have a molecular weight between 50,000 and 250,000), indicated that similar results would be expected with water-soluble cationic flocculants supplied with the following trademarks when used in the quantities indicated (100% active weight basis): NALCOLYTE ®7107 (0.025%), NALCLEAR ®7122 (1.00%), NALCOLYTE ®8102, (0.50%), NALCOLYTE ®8101 (1.0%), NALCOLYTE ®8100 (1.0%). Information from the suppliers indicates that these polyelectrolytes are quaternary, low molecular weight polymers.

NALCOLYTE 8101—Aqueous solution of polyquaternary amine chloride, moderate molecular weight polymers.

NALCOLYTE 7107—Aqueous solution of polyamine, low molecular weight.

NALCOLYTE 8100—Aqueous solution of quaternary polyamine, moderate molecular weight.

The exact structural formula of the preferred diallyl polymers has not been completely delineated. It is believed that either of the two ring structures set forth below could represent the structure,

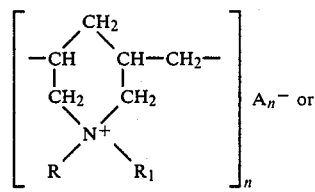

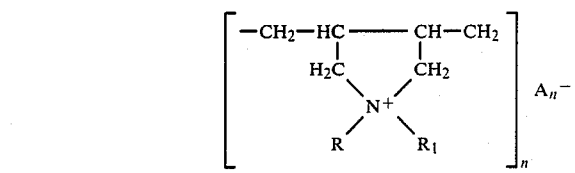

wherein: R and $R_1$ are selected from hydrogen or an alkyl group of 1-18 carbon atoms, n indicates repeating units, and $A^-$ is an anion such as $Cl^-$. The preferred compounds are dialkyl diallyl quaternary ammonium salt polymers which contain alkyl groups R and $R_1$ of 1-4 carbon atoms, preferably methyl, and n is an integer of 5 to 1,000. Such polyelectrolytes are known flocculating agents. For example, U.S. Pat. No. 3,994,806 and U.S. Pat. No. 4,450,092 disclose the use of dimethyl diallyl ammonium chloride salt polymers in combination with aluminum and iron salts or a polyacrylamide in coagulating finely divided solids in turbid waters. It should be understood that incorporation of other anions in place of chloride ion is possible, although performance could be affected. Examples of such other anions are acetate, sulfate, nitrate and hydroxide.

Satisfactory results have been realized when the polyelectrolyte was added to deflocculated clay suspensions having pH values in the range of 6 to 9. After addition of polyelectrolyte, the suspension is substantially thickened as a result of flocculation. The resulting thickened system is then acidified, typically to pH 3 to 6, preferably 4.5 to 5.5, and bleached using a conventional bleach reagent (hydrosulfite salt such as sodium dithionite) and then at least partially dewatered to remove free water and place the recovered bulked clay in a form such that it can be washed to remove ions in the flocculated clay suspension. Normally dewatering is carried out on a filter, for example a rotary vacuum filter.

Bleaches are usually reductants which reduce any color forming ferric iron ($Fe^+$) constituents to a more water soluble and therefore more easily removable ferrous state ($Fe^{2+}$). Suitable bleaching agents include water soluble dithionite salts, and borohydride salts which are advantageously added to the clay mineral slurry in an amount in the range of from 1 to 15 lbs., most preferably about 2 to 6 lbs., of bleaching agent per ton of dry clay. The slurry of polymer treated clay is acidified before filtration in order to enhance filtration even if bleaching is not carried out. Viscosity stability of bulked kaolin products is poor unless bleach residues are removed by washing or sulfonates are used as dispersants.

The clay suspension is dewatered by filtering to a moist filter cake having a solids content of between about 50 to about 60% by weight. The filter cake is washed to remove soluble material and then fluidized by the addition of a secondary dispersing agent which, in accordance with this invention, comprises the mixture of anionic sulfonates and polyacrylate salt added to the filter cake. If the previously described acid bleaching step is omitted, only minimal if any pH adjustment may be necessary to bring pH into the desired range of 6.0 to 7.5. The pH is adjusted to a value between 6.0 and 7.5, preferably 6.8 to 7.5, using a suitable base such as sodium hydroxide.

The presence of the cationic polyelectrolyte significantly improves the rate of dewatering that can be achieved with conventional filtration equipment (e.g., a rotary vacuum filter) during the processing of the pigment. Thus, the presence of polyelectrolyte during filtration decreases filtration costs, and the increased filtration rate compensates in part for the cost of the cationic polyelectrolyte. It should be noted that the amount of polyelectrolyte used in practice of the present invention is not selected to maximize settling or filtration rates since in practice of the invention the bulked structure must be capable of being formed to clay-water system having usable viscosity after addition of a suitable quantity of deflocculating agent. In some cases, it will be necessary during manufacture to apply mechanical work to the bulked clay in the filter cake while adding a deflocculating agent in order to obtain a desired low viscosity. Filter cake solids vary with the equipment used and the level of vacuum applied. Solids also vary with the particle size distribution of the clay. Generally, addition of polyelectrolyte flocculant usually decreases the solids content of the filter cake. The filter cake is washed with water to remove soluble matter. It has been found that use of hot water, e.g., water having a temperature above 100° F. and below the boiling point is beneficial. Use of hot wash has resulted in products having a lower Brookfield viscosity than was obtained when wash water was at ambient temperature. The use of hot was results in filter cakes having a reduced content of salts. For example, filter cakes having specific resistances ranging from about 13,000 to 50,000 ohm-cm resulted from washes at 120°-140° F. while unheated water in similar amount result in cakes having specific resistances of about 6000 ohm-cm. Specific resistance measurement is made on washed filter cake diluted to 10% solids with deionizined water.

In some cases, it is necessary to increase the solids of the filter cake to realize the desired reduction in Brookfield viscosity of the product, especially when the work input during blunging is low. For example, in the case of one bulked clay which produced a filter cake having solids content of 55%, the desired reduction in viscosity necessitated addition of dry clay to build up to a solid content of 59% prior to spray drying before the mechanical work was effective.

The dewatered and washed filter cake may be fluidized by adding a deflocculant and supplied for shipment in slurry form as mentioned above. Alternately, the filter cake can be fluidized by addition of a deflocculant and then spray dried to produce a dry so-called "predispersed" product in dustless form.

The resultant bulked polyelectrolyte treated clay product, after addition of the clay dispersing agent, is used to form high solids (at least 60% clay solids) suspensions in water. These suspensions are then formed into aqueous coating colors suitable for applying on paper. Alternatively, the bulked product may be used as a filler for paper webs. When forming a high solids clay slurry having a higher solids content than the filter cake, it will be necessary to add dry, previously bulked and dried clay to build up the solids content of the slurry obtained by adding dispersants to fluidize the filter cake. For example, when the filter cake is recovered at 55% solids and it is desired to fluidize the filter cake to form a slurry having a solids content of 62% for shipment, dry previously bulked clay should be mixed with the filter cake before or after, preferably after adding dispersants. Since the spray dried bulked clay already contains a dispersant, the amount of dispersants added to the mixture of filter cake and dry clay will be less than it would be needed if only filter cake solids were used as the source of bulked clay in the slurry.

We prefer to prepare fluidized slurries of bulked clay that do not contain condensed phosphate salts as dispersants because of the lack of hydrolytic stability of such materials. Thus, while we prefer to prepare phosphate free high solids slurries, traces of phosphate dispersants can be present.

The kaolin clay pigments bulked in accordance with practice of the present invention are especially useful in preparing coating colors for coating lightweight publication papers, particularly magazine stock, to achieve coated papers having excellent opacity and printability. Coat weights of light weight coated publication papers are usually in the range of 3 to 7 lbs/3300 ft². The printability and opacity are generally at least equal (and usually superior) to that achieved by the commerically used blend of delaminated kaolin clay and calcined kaolin clay.

Typical pigments of the invention have the following properties:

| | |
|---|---|
| G.E. Brightness, % | At least 85 |
| +325 mesh residue, wt % | Less than 0.001 |
| Particle size | |
| % Finer than 2 micrometers | At least 80% |
| Average size, micrometer | 0.6–0.8 |
| Scattering coefficient, m²/g | |
| @ 457 nm | At least 0.15 |
| @ 577 nm | At least 0.10 |
| Brookfield viscosity of 62% solids slurry, cp | |
| @ 20 rpm | Below 1000 cp, preferably below 500 cp, most preferably 300 cp. |
| @ 100 rpm | No greater than at 20 rpm |
| Hercules viscosity end point, "A" bob (r.p.m./dyne-cm × 10⁵) | Above 500 rpm, preferably above 800 rpm and, most preferably, no greater than 16 × 10⁵ dynes at |

| -continued |
| --- |
| 1100 rpm |

Bulked clay pigment slurries of the invention possess adequate shear stability to survive production and handling conditions such as described above, using conventional commercial processing equipment and also are sufficiently stable for use in high speed coaters used by paper industry.

In preparing coating colors, conventional adhesives or mixtures of adhesives are used with the deflocculated clay slip. For example, useful coating color compositions are obtained by thoroughly mixing with the clay slip from about 5 to about 20 parts by weight adhesive per 100 parts by weight of polyelectrolyte treated clay. Such a coating color, when used for coating lightweight publication paper, produces a product which has excellent opacity, gloss and printability.

The term "adhesive" as used herein refers to those materials known for use in connection with paper pigment, which aid in binding the pigment particles together and, in turn, binding the coating to the paper surface. Such materials include, for example, casein, soybean proteins, starches (dextrins, oxidized starches, enzyme-converted starches, hydroxylated starches), animal glue, polyvinyl alcohol, rubber latices, styrene-butadiene copolymer latex and synthetic polymeric resin emulsions such as derived from acrylic and vinyl acetates. When the adhesive comprises a starch which is steam jet cooked in the presence of added bulking pigment, the mixture of anionic sulfonates with sodium polyacrylate permits the steam jet cooking of this mixture and avoids the development of extremely viscous, unworkable coating colors. Steam jet cooking of a coating color composition is described in Canadian Pat. No. 1,140,332. Typical temperatures are 225°-325° F.

The coating color compositions prepared in accordance with the present invention can be applied to paper sheets in a conventional manner.

All particle sizes used in the specification and claims are determined with the SEDIGRAPH ® 5000 particle size analyzer and are reported as equivalent spherical diameters (e.s.d.) on a weight percentage basis.

In the examples, test results were obtained essentially according to the following TAPPI (Technical Association of the Pulp and Paper Industry) procedures:

75° gloss—TAPPI Standard T480 om-85. Value denotes the evenness or smoothness with which a coating lays on the surface of paper.

B & L opacity—TAPPI Standard T425 om-86

G. E. brightness—TAPPI Standard T452 om-87

Light scattering and gloss of pigments were determined in some instances. This was done by coating the kaolin clay suspensions onto black glass plates at a coat weight of 7.0–14.0 g/m² (expressed as dry clay). The reflectance of the coatings after drying in air is measured at wavelengths 457 nm and 577 nm by means of an Elrepho reflectometer. The reflectance values are converted by the use of Keubelka-Munk equations to light scattering values (m²/g). The light scattering values are a measure of the opacity potential of the clay because the higher values indicate that light, rather than passing through the pigment coating, is reflected and scattered back. The higher the light scattering value, the higher the opacity potential of the clay. Reflectance is measured at two different wavelengths. The 457 nm wavelength corresponds to the wavelength used in the TAPPI brightness measurement and the 577 nm wavelength is used to measure opacity.

In preparing slurries for measurement of high shear (Hercules) and low shear (Brookfield) viscosity, the procedure described hereinafter was used. Brookfield viscosity was measured using TAPPI procedure T648 om-81 at 20 r.p.m. using the 2 or 3 spindle; in some cases Brookfield viscosity was measured at 100 r.p.m. using the 3 spindle. All slurries were formulated with the optimum amount of dispersant needed to produce minimum viscosity, following the PL-3 procedure of Engelhard Corporation. Following is a description of the PL-3 procedures.

Optimum dispersions determined by the PL-3 procedure involves making small additions of dispersant to a slurry, mixing and then determining the Hercules and Brookfield viscosity. The dispersant level before the viscosity increases (becomes poorer) is the optimum dispersant level. The optimum dispersant level for Hercules viscosity may be different than the optimum for Brookfield viscosity and therefore Hercules or Brookfield optimum is specified.

Equipment
Waring Blendor ® mixer
Hercules Viscometer
Brookfield Viscometer
Low shear propeller mixer
Constant temperature bath
Laboratory balance
Deionized water
Pigment (500 oven dried grams or 250 grams for calcined clay)
Dispersant (inorganic or organic)
Electric, forced air oven at 105±3° C.

Procedure

A. Prepare hydrous kaolin slurry by method (vide infra). Add no dispersant for predispersed clay and minimum amount (about 0.2%) of dispersant for undispersed clay.

B. Determine the percent solids of the sample of slurry by drying part of the sample in an oven.

C. Determine the Brookfield viscosity and Hercules viscosity of the sample.

D. While mixing the sample using the a low shear propeller mixer, add 0.05% dispersant based on pigment weight and continue mixing for five minutes.

E. Determine the Brookfield viscosity and Hercules viscosity.

F. Repeat D and E until the viscosity increases (becomes poorer).

G. Optimum amount of dispersant is the amount required to achieve minimum viscosity.

Hercules viscosity values reported herein were measured with Hercules Hi-Lo Shear Viscometers, Model ET-24-6. These instruments are equipped with a cup to contain the sample fluid and are supplied with a series of rotating bobs and spring sets which provides a variety of shear stress conditions. One Hercules viscometer was equipped with the "A" bob and was employed to operate with the 100,000 dyne cm/cm spring up to 1100 r.p.m. for clay water slurries; another was set to operate with an "E" bob and a 400,000 dyne cm/cm spring up to 4400 r.p.m. to measure viscosity of coating colors.

TAPPI Procedure T648 om-81 gives further description of the procedures used to measure high shear viscosity. It is common to report high shear viscosity of clay-water as either dyne-cm $\times 10^5$ torque at 1100 r.p.m.

bob speed or as bob speed in r.p.m. at which the maximum torque of $16 \times 10^5$ dyne-cm was obtained. Similarly, the coating color viscosity is reported as either dyne-cm $\times 10^5$ torque at 4400 r.p.m. bob speed or as bob speed in r.p.m. at which the maximum torque of $64 \times 10^5$ dyne-cm was obtained.

Viscometers were operated in the manner summarized below:

1. Set the graph and pen in place on the recording drum (pen is placed on origin on graph paper).
2. Remove the cup and bob from the water bath at 80° F. and dry.
3. Pour $28 \pm 2$ cc of the fluid to be tested into the cup and set in place on the viscometer. Use of a syringe will frequently facilitate filling the cup.
4. Attach the bob by rotating it counter-clockwise making it only finger tight, then immerse it in the fluid cup to its limit. The fluid should come up to the top of the bob. If not, then more fluid must be added until it covers the bob.
5. Start the viscometer motor (lower left front of viscometer).
6. Press the "AUTO" switch on the control panel.

The pen will proceed to draw a graph of shear rate versus shear force (torque). If the viscometer reaches its maximum r.p.m. setpoint, the pen will automatically return to its starting going. However, if the pen goes beyond the maximum allowable torque before reaching maximum r.p.m., the viscometer will automatically shutdown and the recording drum will have to be returned to its original position using the crank handle.

The precision is based on a dyne-cm $\times 10^5$ reading at 1100 r.p.m. and r.p.m. reading at 16 dyne-cm $\times 10^5$ because these are the values reported for products. The 95% confidence level for the precision for three operations at two different viscosities follows:

| Average | Precision |
| --- | --- |
| 4.4 dyne-cm $\times 10^5$ at 1100 r.p.m. | 16.8% |
| 500 r.p.m. at 16 dyne-cm $\times 10^5$ | 21.4% |

In measuring printing properties by the so-called 75° Gloss Ink Holdout Test, the procedure used was one described in a publication by Otto P. Berberich, TESTING PRINTABILITY OF PAPER AND BOARD WITH INK-III, November 1957 IPI. The procedure gives results relative to the printing qualities on a letter press proofpress using halftone printing plates.

The K & N Ink Holdout Test entails applying an excess of heavy bodied black pigmented printing ink to coated paper, removing the excess and measuring the contrast between the image and the background.

In measuring printability of the paper coated with the coating color, the Helio test was used. This test is widely used to evaluate printability by the gravure method. In the test, the coated sheet is printed with a gravure cylinder, which has a pattern of ink holding cavities that decrease in diameter from one end to the other. Thus the test print has large dots at one end and small ones at the other. Skipped dots are counted starting at the large-dot end, and the print quality is reported as the distance in millimeters from the start of the test print to the 20th missing dot. For a given coat weight, the longer the distance in millimeters, the better the printability of the coated paper.

The following laboratory and pilot plant procedures were used for making down slurries of experimental and control pigments. In the laboratory procedure, a Waring Blendor ® mixer Model 31 BL 46 was used with a 40 oz. blender jar and cover and a Variac power supply control. The dispersant was dissolved in a quantity of water calculated to provide a 62.0-62.5% solids slurry containing 300 g. of pigment. Three hundred (300) g of pigment was added gradully at moderate speed. When all of the pigment was added, the blender was run for one minute at 50 volt Variac setting.

Pilot plant makedown was performed with a Cowles mixer (10" vessel dia. 4" blade dia. 3300 r.p.m. blade speed, 3455 ft/min tip speed). Dispersant was added to water, followed by addition of pigment to water, as in the laboratory procedure, and mixed at slow speed. The mixer was then run at 3300 r.p.m. for 5 minutes.

Effect of Aging Temperature

Clay slurries are conventionally evaluated for viscosity stability on storage by determining the viscosity change with time for samples stored at 110° F. in a shaker-type water bath that provides gentle back-and-forth agitation. Presumably samples that stay fluid for 6 to 8 weeks are sufficiently viscosity stable for slurry shipment. As a cautionary note, laboratory studies show that the 110 degree shaker bath aging can actually accelerate gel formation. Several samples have shown significantly greater gel formation and listed as percent (%) of the original volume of slurry.

Typical procedures for preparing cationically bulked kaolin clays with polyamines and quaternary ammonium salts are described in U.S. Pat. Nos. 4,075,030, 4,076,548 and 4,078,941, the teachings of which are incorporated by cross-reference. Specific examples of preparing cationically bulked clays with cationic polyelectrolytes such as CALGON 261 LV polymer are described in pending allowed U.S. application Ser. No. 06/861,943, filed May 12, 1986, the entire contents of which are incorporated herein by cross-reference.

Unless otherwise indicated, test evaluations described below were carried out with samples of kaolin clay from Georgia bulked with CALGON 261 LV.

In some cases the quantity of residual soluble salts remaining in the filter cake was varied. The following Example 1 is typical of the procedures used to prepare filter cakes of the bulked clay and spray dried products used in carrying out the other examples.

EXAMPLE 1

A high purity kaolin crude clay from a deposit in Washington County, Ga., known as North Jenkins crude, was degritted, after dispersion at approximately 35% solids in water having dissolved therein sodium silicate having a $Na_2O/SiO_2$ weight ratio of about 3/1 and sodium carbonate. Approximately 1.5-2.0 lbs. of sodium silicate and 1.5-2.0 lbs. of carbonate were used per ton of dry clay. The suspension was then degritted and fractionated in a centrifuge to 87% finer than 2 micrometers. The median size of the fractionated suspensions was $0.59 \pm 0.03$ micrometers; weight percentage finer than 0.3 micrometers was 17%. Solids were about 20% and pH about 7. The suspension was then passed through a high intensity magnetic separator for purification. CALGON 261 LV polymer was added to the suspension of purified clay at the 0.08% level based on dry weight of clay. The polyelectrolyte was added as an aqueous solution of 0.5% (wt.) concentration. after 1 week in the shaker bath than after 1 week of static aging at the same temperature. It has been previously reported in the literature that rhythmic vibrations can accelerate gel formation in some colloidal systems. More rapid bacteria growth at 110° F. could also be a factor. An alternative, more rapid, method was used in illustration examples.

Gel Strength

It has been observed that gel formation, not just viscosity increase, is a major problem in storage stability of slurries of bulked pigment. Various techniques were investigated as methods of determination of gel strength.

It was found that an apparent yield point could be measured using the Stormer viscometer. The procedure used was to equip the viscometer with the paddle-type measuring head (used to measure Krebs viscosity in paints), immerse the measuring head in undisturbed slurry, and then add weights to the drive mechanism until the measuring head started to turn. The weight required to start the paddle in motion is a measure of gel strength, larger weights denoting stronger gels. Typical values obtained using completely ungelled samples were around 15 grams, highly gelled samples (unpourable) gave values in excess of 200 grams.

Measurements have been made using the well-known (ASTM D2884-82) cone penetrometer test modified by using a smaller and heavier cone and the results considered in making evaluations.

An easy and practical test for gel strength is a "pour test". If the undisturbed slurry pours out of the jar when it is inverted, it is likely that the gel is not so strong that tank car unloading would be a problem. The test can be made semiquantitative by measuring the percent remaining in the jar after a fixed drainage time. This test, described hereinafter, was used in tests in illustrative examples. After storage in a tightly closed 8 oz. glass jar in an 140° F. oven, the slurries at 62% solids were poured without mixing. After one (1) minute of pouring, the remaining sediment was measured. The pH was adjusted to 5.0±0.5 by addition of sulfuric acid and then sodium dithionite ($Na_2S_2O_4$) bleach was added in amount of 6#/ton of clay.

Slurries prepared as described above were then filtered on rotary vacuum filters to produce filter cakes having 52-60% solids. The filter cakes were throughly washed with warm water (100°-120° F.) and fluidized by adding dispersants followed by blunging in high speed equipment. The pH of the fluidized cake was adjusted to 6.5-7.0 by addition of sodium hydroxide. In some cases suspensions were then dried by spray drying.

In the following examples different dispersants were tested using filter cakes prepared substantially as described in Example 1.

EXAMPLE 2

Tests carried out to identify materials capable of maintaining low viscosity on storage and to elevate the thermal thickening temperature of bulking pigments are described in this example. These tests were carried out with filter cakes obtained by bulking a kaolin clay with CALGON 261 LV polymer, substantially as described in Example 1. Letter designation, such as J and K, were used to indicate that filter cakes from different production runs were used. Initially a screening test was carried out in which agents were added to slurries dispersed with MAYOSPERSE 148D (sodium polyacrylate, molecular weight about 2500.) Tests results on the effect of using various anionic sulfonate blocking agents on thermal thickening temperature are shown in Table 2. From Table 2 it can be seen that anionic compounds affected the thermal thickening temperature markedly. The best of those tested increased the temperature by 46° C., while the worst of those tested actually lowered this temperature by 14°.

TAMOL 850 (an anionic sodium salt of polymethacrylic acid, mol. wt. of about 12,000) was found to be effective in raising the thermal thickening temperature and therefore, it was further tested as to its influence on other properties. Unfortunately, the more extensive testing did not show the TAMOL 850 to be consistently effective nor as good as other materials subsequently evaluated. Data for MAYOSPERSE 148D and TAMOL 850 showed that the TAMOL 850 was roughly equivalent to MAYOSPERSE 148D in obtaining low viscosity but it obtained this low viscosity only over a narrow range of dispersant concentration. Scattering power at 577 nm as measured by black glass drawdowns was evaluated. It was found that as dispersant level was increased with either dispersant, scattering power was decreased. It was found that TAMOL 850 reduced scattering more than Mayo 148D.

Samples of both the Mayo 148D and TAMOL 850 dispersed samples were tested for viscosity stability using the accelerated 140° F. aging test. It was found that TAMOL 850 did not significantly increase thermal stability over that obtained by the use of MAYOSPERSE 148D polyacrylate dispersant. Blends of this dispersant, hereinafter "M148D", with TAMOL 850 did, however, increase thermal thickening temperature and viscosity stability to some extent.

Data in Table 2 show that LIGNOSITE 458 and DYQEX lignosulfonate were effective in raising the thermal thickening temperature. Both compounds are approved by the FDA for use in packaging materials in contact with food. Data in Table 3, give test results on combinations of these lignin sulfonates with a polyacrylate salt dispersant (M148D). Note that this study was carried out with filter cakes with a pH of about 4 to 5 and a low specific resistance of 6,500 ohm-cm indicating a relatively high level of soluble salts. From this table it can be readily seen that the lignin sulfonates added at the 0.05% and 0.10% levels gave low initial viscosity and raised the thermal thickening temperature while maintaining good scattering power. When subjected to the accelerated aging test at 140° F., all of the samples containing these lignin sulfonates gave improved viscosity stability and resistance to gelling as compared to the sample dispersed with M148D alone. (Table 4). At the end of 6.8 days aging, the sample dispersed with M148D alone had gelled sufficiently so that a cone penetrometer reading could be taken. The samples with the sulfonates showed no gel formation but did give a soft sediment that contained about 10% of the total clay.

The result of a separate study using DYQEX lignin sulfonate surfactant with M148D are shown in Table 5. Again, lignin sulfonate addition raised the thermal thickening temperature and decreased the amount of gelling in the accelerated aging test. The effect of DYQEX dispersant addition in this study was not as great as in the study summarized in Tables 3 & 4. It is believed that this result was obtained because the filter cake used in this test had a lower soluble salt content as measured by its specific resistance. Graphs plotting Brookfield viscosity as a function of aging time showed that addition of this lignin sulfonate surfactant keep overall viscosity lower as well as inhibiting gel formation.

As shown in Table 2 LOMAR D (naphthalene sulfonate formaldehyde complex) was effective in raising the thermal thickening temperature by 46° C. when used in conjunction with M148D. Note that this result was obtained on the low specific resistance "aged" filter cake. It appears that scattering was reduced somewhat by additions of LOMAR D sulfonate but still met a desired value at the 0.10% addition level. (See Table 2.)

Table 6 shows the results obtained in the accelerated aging test at 140° F. Addition of LOMAR D sulfonate at 0.05% and 0.10% gave significantly improved viscosity stability.

In the following examples, filter cakes of the chemically structured kaolin were dispersed in accordance with the present invention by the mixture of polyacrylate, lignin sulfonate and naphthalene sulfonate by one of the following procedures:

Procedure 1. Solution of polyacrylate at 42% concentration added first, followed by addition of the two sulfonate dispersants in dry form.

Procedure 2. Solution of polyacrylate added first, followed by a mixture of both sulfonates (dissolved in water at 20% concentration).

Procedure 3. Solution of all three dispersants added at once. This solution was made by making a 20% solution of lignin and naphthalene sulfonates followed by mixing with a 42% solution of polyacrylate and adjusting the final solids to 20%.

EXAMPLE 3

This example demonstrates benefits of using a mixture of sulfonate dispersants including a lignin sulfonate (LIGNOSITE 458) and a naphthalene sulfonate formaldehyde complex (LOMAR D) with a sodium polyacrylate salt (M148D) to disperse a cationically flocculated, bulked kaolin pigment.

Portions of a filter cake prepared substantially as described in Example 1 were dispersed as indicated below using one of the procedures described hereinabove. The pH of each slurry was adjusted to 7.0 with NaOH and slurries were sheared at 50 volts for one minute. KELZAN thickener (0.06%) by weight of the dry bulked pigment was added (in dry form) and mixed to some samples as indicated. All slurries were stored in an oven maintained at 140° F. and evaluated for gelation. All slurries were at 62% solids during the storage tests.

Effect of Dispersants and Thickening Agents on Properties of High Solids Slurries of Bulked Pigments

| Dispersant, wt. % active ingredient (based on dry weight of bulked clay) | Storage Test Results 14 Days Storage % Unpourable |
| --- | --- |
| .15% M148D, .05% LS458* | 85% |
| .15% M148D, .06% K, .05% LS458 | 60% |
| .15% M148D, .10% LS458 | 94% |
| .15% M148D, .06% K, .10% LS458, | 84% |
| .15% M148D, .05% LS458, .05% NS* | 49% |
| .15% M148D, .06% K, .05% LS458, .05% NS. | 10% |
| .15% M148D, .075% LS458, .075% NS | 13% |
| .15% M148D, .06% K, .075% LS458, .075% NS | 8% |
| .05% M148D, .075% LS458, .075% NS | 74% |
| .05% M148D, .06% K, .075% LS458, | 80% |

| Dispersant, wt. % active ingredient (based on dry weight of bulked clay) | Storage Test Results 14 Days Storage % Unpourable |
| --- | --- |
| .075% NS | |

*LS458 = LIGNOSITE 458 lignin sulfonate;
NS = LOMAR D sulfonate;
M148D = sodium polyacrylate (Mayo 148D);
K = KELZAN.

The order of addition of dispersants to the filter cake was: M148D (solution) added first followed by LS458 (dry), then LOMAR D (dry). After mixing, Kelzan thickener was added to the fluid samples last followed by additional mixing.

The data tabulated above show that a mixture of sulfonate dispersants was more effective in preventing gelation on storage than individual sulfonates when used in combination with the polyacrylate and KELZAN thickener. The data also show that KELZAN thickener improved storage stability when using mixed dispersants. Also shown is that the amount of M148D dispersant necessary for effective storage was 0.15% based on the weight of the clay. When using only 0.05% polyacrylate dispersant with the mixture of sulfonates, the slurries gelled during storage at elevated temperature.

EXAMPLE 4

This example demonstrates further the beneficial effect of using mixed sulphonate dispersants (in addition to the polyacrylate, Mayo 148D) to prepare high solids slurries of cationically bulked clay.

A filter cake substantially the same as described in Example 1 was washed with hot water to a specific resistance of about 15000 ohm-cm and was then dispersed by adding M148D followed by LS and NS in dry form (Procedure 1). Solids were 62%. The pH was adjusted to 7.0 using NaOH. Brookfield viscosity measurements were made on the fresh slurries. Two samples of each dispersant combination were used. Storage stability was measured after storing at 140° F. for 7 days and 14 days.

Effect of Dispersants and Thickening Agents on Properties of High Solids Slurries of Bulked Pigments

| Sample | Dispersant | Brookfield Viscosity | | Storage Test Results % Unpourable | |
| --- | --- | --- | --- | --- | --- |
| | | 20 rpm | 100 rpm | 7 Days | 14 Days |
| 1 | .075% M148D, .0375% LS458, .0375% NS .03% KS | 290 | 150 | 53% | 92% |
| 2 | .10% M148D, .05% LS458 .05% NS | 75 | 85 | 11% | 14% |
| 3 | .10% M148D, .05% LS458 .05% NS, .05% KS | 265 | 145 | 8% | 11% |
| 4 | .15% M148D, .10% LS458 | 210 | 125 | 31% | 72% |

The results tabulated above show that a mixture of sulphonates is more effective than either sulfonate alone, and that KELZAN S thickener (KS) slightly improved the storage stability.

EXAMPLE 5

In this evaluation, a filter cake from a run substantially as described in Example 1 (run N) was rewashed to a specific resistance of about 15,000 ohm-cm. This filter cake was dispersed with a mixture of Mayo 148D, LS458 and NS. The slurries at 62% solids were sheared (50 volts, 1 minute) and evaluated in storage in a 140° F. oven along with a make down of spray dried bulked pigment (production sample "E") dispersed with only Mayo 148D. Table 7 summarizes Brookfield viscosity of freshly prepared slurries and stability after 14 days storage at 140° F.

The results of the storage tests shown in Table 7 are summarized as follows:
1. Storage stability was improved only slightly with the addition of KELZAN S.
2. A minimum of 0.05% each of lignin sulfonate (LS) and napthalene sulfonate formaldehyde complex (NS) must be used to achieve 20% or less of unpourable slurry.
3. Best results were obtained by using 0.15% M148D and at least 0.075% of LS and 0.075% of NS.
4. This experiment confirmed earlier findings that a mixture of M148D with LS 458 and NS was effective in providing storage stability to slurries of bulking pigments.

It was also noted in the tests described in Example 5 that the remaining sediment (after pourability test) was very soft and easily dispersible after minimal work input when using the dispersant combination of this invention.

EXAMPLE 6

This example demonstrates the effects of using suitable quantities of a mixture of sodium polyacrylate, lignin sulfonate and naphthalene sulfonate formaldehyde complex to fluidize a filter cake of cationically bulked clay, spray drying a portion of the fluidized filter cake and adding the spray dried filter cake to another portion of the fluidized filter cake to form a slurry having 62% solids. The example shows also the desirable properties of the spray dried portion. Thus, the example demonstrates the beneficial effects of the dispersant mixture of the invention on cationically bulked clay provided as both high solid slurries and spray dried products. The example also demonstrates how to prepare a 62% solid slurry from a filter cake having a lower solids content.

In the example, a filter cake of production run O, prepared substantially as shown in Example 1, was used. The filter cake contained 55% solids.

Portions of the filter cake from run O were dispersed with the following combination of dispersants, using the procedure described in Example 3.

| Dispersant Composition No. | Mayo 148D | LS 458 | NS |
| --- | --- | --- | --- |
| 1 | .15% | .050% | .050% |
| 2 | .15% | .075% | .075% |
| 3 | .10% | .075% | .075% |
| 4 | .075% | .075% | .075% |

A portion of each dispersed filter cake was spray dried and the spray dried material added back to the same slurry from which the portion was withdrawn in an amount sufficient to form slurries each containing 62% solids. Data in the following table shows viscosity and black glass scattering of slurries made from the filter cakes (made up to 62% solids) and slurries of all spray dried material, diluted wih water to form 62% solids slurries. All samples were sheared (50 volts, 1 minute) and pH was adjusted to 7.0 with 10% NaOH solution before testing.

TABLE 1
EFFECT OF DISPERSANTS ON VISCOSITY AND OPACIFICATION

| Slurry/ Dispersant Comp. | Brookfield 20 rpm (CP) | Brookfield 100 rpm (CP) | Hercules (dyne-cm) × $10^5$/rpm | Scattering S457 ($m^2$/g) | Scattering S577 ($m^2$/g) |
| --- | --- | --- | --- | --- | --- |
| F. C. Adj. #1 | 80 | 85 | 5.6/1100 | .187 | .141 |
| All S. D. #1 | 75 | 80 | 9.8/1100 | .178 | .133 |
| F. C. Adj. #2 | 150 | 110 | 3.9/1100 | .168 | .126 |
| All S. D. #2 | 100 | 85 | 2.8/1100 | .158 | .118 |
| F. C. Adj. #3 | 88 | 85 | 4.2/1100 | .169 | .125 |
| All S. D. #3 | 75 | 75 | 4.6/1100 | .163 | .119 |
| F. C. Adj. #4 | 75 | 90 | 9.8/1100 | .171 | .125 |
| All S. D. #4 | 65 | 75 | 13.6/1100 | .179 | .135 |

*F. C. Adj. = Filter cake adjusted to 62% solids by adding spray-dried pigment.
**All S. D. = Pigment spray dried and then made down to 62% solids.

EXAMPLE 7

This example demonstrates the usefulness of the mixed dispersant system of the present invention in preparing slurries containing the bulked pigment and uncooked starch in hard water. Pigment and starch are frequently slurried together in the instances when steam jet cooking is employed.

When the pigment slurries are prepared from well washed filter cakes by fluidizing such filter cakes with a polyacrylate dispersant and bringing up the solids content to 62% by the addition of the spray dried product, the slurries have very high viscosity (data not shown) after seven (7) parts by weight of starch (Penford PG 250) to 100 parts of bulked pigment is added. The hardness of water contained in this slurry corresponds to that used in washing the filter cake, and is about 20 ppm (as calcium carbonate).

To illustrate the effectiveness of the mixed dispersant system of the present invention, the bulked pigments prepared by fluidizing the filter cake with the combination of dispersants described in example 6 were spray dried and then were made down in tap water. The hardness of this water was about 120 ppm (as calcium carbonate). Starch was added to this slurry as described above. Viscosity measurements presented below showed only minimal change in viscosity upon addition of starch.

| Dispersant Composition Number | Brookfield (without starch) 20 rpm | Brookfield (without starch) 100 rpm | Brookfield (with starch) 20 rpm | Brookfield (with starch) 100 rpm |
| --- | --- | --- | --- | --- |
| #1 | 150 | 110 | 500 | 210 |
| #2 | 125 | 100 | 225 | 135 |
| #3 | 125 | 100 | 250 | 140 |
| #4 | 175 | 110 | 450 | 190 |

When the preparation of similar slurries was attempted in tap water using polyacrylate dispersants alone in fluidizing the filter cake prior to spray drying, very high viscosities or pasty consistencies were obtained in pigment and starch containing slurries.

EXAMPLE 8

This example illustrates the properties of coating colors and paper coated with coating colors prepared from high solid slurries of cationically bulked clay.

The following coating color composition was used in all tests. The ingredients were mixed in the order listed.

The pH was then adjusted to 8.0 with ammonium hydroxide. Solids of the coating color was 57%.

| Parts by weight, dry Basis | |
|---|---|
| Pigment | 100 |
| Cooked starch (Penford PG 250) | 7 |
| Dow 620 latex (50% solids) | 4 |
| NOPCOTE C104 (calcium stearate emulsion, about 50% solids) | 0.5 |

Control coating colors pigmented with the known 90/10 blend of LITECOTE ® hydrous kaolin and AN-SILEX ® 93 calcined clay were included in the evaluations. Also included was a cationically bulked spray dried pigment from run E in which the dispersant was 0.20% M148D (added prior to spray drying) and 0.05% lignosulfonate (added during coating color preparation.) Bulked products, fluidized in accordance with the invention (Example 6) by adjusting a filter cake (O run) to 62% solids as in Example 6 were evaluated to determine the effect of using the three component dispersant mixture on coating color viscosity and on the performance properties of coated sheets.

Viscosity testing (results not reported herein) showed that all coating colors made in accordance with the invention had low Brookfield and Hercules viscosity. Data in Table 8 shows that samples fluidized in accordance with the invention provided coated sheets having desired printing properties.

Although variations are shown in the present application, many modification and ramifications will occur to those skilled in the art upon reading of the present disclosure.

TABLE 2

ANIONIC BLOCKING AGENTS
Initial test results (before aging)

| Clay used | Compound | % Added | pH | Brookfield 20 RPM | Brookfield 100 RPM | Herc. dynes/RPM | Thick. temp, °C. | Black Glass* S457 | Black Glass* S577 |
|---|---|---|---|---|---|---|---|---|---|
| 1 | Control | 0 | 6.5 | 94 | 120 | 16/425 | 69 | — | — |
| 1 | Sodium citrate | 0.016 | 6.14 | 90 | 123 | 16/430 | 63 | — | — |
| 1 | " | 0.038 | 5.70 | 196 | 197 | 16/345 | 65 | — | — |
| 1 | Sodium polyacrylate | 0.014 | 6.10 | 104 | 129 | 16/425 | 62 | — | — |
| 1 | Sodium polyacrylate | 0.014 | 6.57 | — | — | — | 66 | — | — |
| 1 | Sodium polyacrylate | 0.034 | 6.10 | 104 | 129 | 16/420 | 65 | — | — |
| 1 | Sodium polyacrylate | 0.034 | 6.58 | — | — | — | 67 | — | — |
| 1 | Sodium diglycolate | 0.019 | 5.84 | 212 | 200 | 16/320 | 55 | — | — |
| 2 | Control | 0 | 6.54 | 108 | 130 | 16/415 | 63 | — | — |
| 2 | Sodium polyacrylate | 0.014 | 5.95 | 104 | 135 | 16/350 | 54 | — | — |
| 2 | Sodium polyacrylate | 0.014 | 6.50 | — | — | — | 65 | — | — |
| 2 | Sodium polyacrylate | 0.034 | 5.70 | 130 | 162 | 16/310 | 51 | — | — |
| 2 | Sodium polyacrylate | 0.034 | 6.50 | — | — | — | 65 | — | — |
| 3 | Control | 0 | 6.63 | 92 | 118 | 16/400 | 75 | — | — |
| 3 | Sodium polyacrylate | 0.014 | 6.04 | — | — | 16/440 | — | — | — |
| 3 | Sodium polyacrylate | 0.014 | 6.50 | 88 | 116 | 16/440 | 74 | — | — |
| 3 | Sodium polyacrylate | 0.034 | 6.00 | — | — | — | — | — | — |
| 3 | Sodium polyacrylate | 0.034 | 6.58 | 84 | 115 | 16/500 | 71 | — | — |
| 5 | Control | 0 | 6.67 | 132 | 161 | 16/375 | — | — | — |
| 5 | Sodium laurate | 0.05 | 6.67 | 126 | 144 | 16/550 | — | — | — |
| 5 | TAMOL 850 ® | 0.05 | 6.86 | 222 | 159 | 16/700 | — | — | — |
| 4 | Control | 0 | 6.60 | 148 | 162 | 16/400 | — | — | — |
| 4 | TAMOL 850 ® | 0.05 | 6.90 | 112 | 128 | 16/665 | — | — | — |
| 4 | " | 0.10 | 7.09 | 300 | 170 | 16/700 | — | — | — |
| 6 | Control | 0 | 6.46 | 72 | 106 | — | — | .181 | .134 |
| 6 | DYQEX ® | 0.05 | 6.39 | 72 | 100 | — | — | .184 | .133 |
| 6 | " | 0.10 | 6.39 | 56 | 88 | — | — | .176 | .127 |
| 6 | LIGNOSITE ® | 0.05 | 6.43 | 74 | 104 | — | — | .178 | .128 |
| 6 | " | 0.10 | 6.48 | 54 | 87 | — | — | .180 | .125 |
| 7 | Control | 0 | 7.5 | 75 | 77 | 8/1100 | 82 | — | — |
| 7 | DYQEX ® | 0.05 | 7.5 | 120 | 110 | 3/1100 | 98 | — | — |
| 7 | " | 0.10 | 7.5 | 90 | 86 | 2/1100 | 95 | — | — |
| 9 | Control | 0 | 5.40 | 560+ | 280+ | — | — | — | — |
| 9 | DYQEX ® | 0.05 | 5.44 | 102+ | 112 | — | — | — | — |
| 9 | " | 0.10 | 5.47 | 74+ | 96 | — | — | — | — |
| 9 | LIGNOSITE 458 ® | 0.05 | 5.52 | 92+ | 94 | — | — | — | — |
| 9 | LIGNOSITE 458 ® | 0.10 | 5.50 | 76+ | 96 | — | — | — | — |
| 6 | Control | 0 | 6.30 | 116 | 135 | — | 54 | .195 | .144 |
| 6 | LOMAR D ® | 0.05 | 6.40 | 68 | 96 | — | 100 | .176 | .125 |
| 6 | " | 0.10 | 6.40 | 52 | 84 | — | 100 | .160 | .115 |
| 5 | Control | 0 | 6.50 | 132 | 161 | 16/375 | 60 | — | — |

TABLE 2-continued

ANIONIC BLOCKING AGENTS
Initial test results (before aging)

| Clay used | Compound | % Added | pH | Brookfield 20 RPM | Brookfield 100 RPM | Herc. dynes/RPM | Thick. temp, °C. | Black Glass* S457 | Black Glass* S577 |
|---|---|---|---|---|---|---|---|---|---|
| 5 | Na dodecyl benzene sulfonate | 0.05 | 6.60 | 82 | 110 | 16/635 | 77 | — | — |
| 5 | Na dodecyl benzene sulfonate | 0.10 | 6.60 | 80 | 109 | 16/800 | 93 | — | — |
| 5 | Na dodecyl sulfate | 0.05 | 6.64 | 122 | 148 | 16/410 | 60 | — | — |
| 5 | Na dodecyl sulfate | 0.10 | 6.69 | 84 | 112 | 16/690 | 66 | — | — |
| 5 | Na$_2$ benz. disulfonate | 0.05 | 6.50 | 1050+ | 590+ | 16/245 | — | — | — |
| 5 | TAMOL 960 ® | 0.05 | 6.87 | 138 | 139 | 16/485 | 65 | — | — |
| 5 | " | 0.10 | 7.01 | 500+ | 308 | 16/500 | 61 | — | — |
| 5 | TAMOL 963 ® | 0.05 | 6.80 | 200 | 184 | 16/455 | 66 | — | — |

*Scatter (m$^2$/g)
Key to clays used:
1. J2 filter cake + 0.15% M148D + 0.10% DA630
2. J2 filter cake + 0.15% M148D
3. J2 filter cake washed to >50,000 ohms + 0.15% M148D
4. J2 filter cake, 6,400 ohms + 0.15% M148D
5. J2 filter cake, 13,200 ohms + 0.15% M148D
6. K2 filter cake, "aged", 6,000 ohms, pH = 4, +0.20% M148D
7. K1 filter cake, 16,000 ohms, + 0.20% M148D
8. Production K2 spray dried product
9. Same as "6" but 0.15% M148D
Note:
The designation "+" after Brookfield viscosity measurements indicates unstable (increasing) viscosity.

TABLE 3

ANIONIC SULFONATES AS DISPERSANTS FOR CATIONICALLY BULKED KAOLIN
Additions to run K filter cake. pH = 4.0
6,500 ohm-cm

| Sample | pH | Brookfield 20 RPM | Brookfield 100 RPM | Therm. Thick, °C. | Black Glass S457 | Black Glass S577 |
|---|---|---|---|---|---|---|
| 0.15% M148D | 5.40 | 560+ | 280+ | — | — | — |
| 0.20% M148D | 6.46 | 72 | 106 | 82 | .184 | .134 |
| 0.25% M148D | 6.70 | 100+ | 75 | 50 | — | — |
| 0.30% M148D | 7.12 | 120+ | 84 | 48 | — | — |
| 0.15% M148D + .05% DYQEX | 5.44 | 102+ | 112 | — | — | — |
| 0.20% M148D + .10% DYQEX | 6.39 | 72 | 100 | 100 | .184 | .138 |
| 0.15% M148D + .10% DYQEX | 5.47 | 74+ | 96 | — | — | — |
| 0.20% M148D + .10% DYQEX | 6.39 | 56 | 88 | 100 | .176 | .123 |
| 0.15% M148D + .05% LIGNOSITE 458 | 5.52 | 92+ | 94 | — | — | — |
| 0.20% M148D + .05% LIGNOSITE 458 | 6.43 | 74 | 104 | 100 | .178 | .128 |
| 0.15% M148D + .10% LIGNOSITE 458 | 5.50 | 76+ | 96 | — | — | — |
| 0.20% M148D + .10% LIGNOSITE 458 | 6.48 | 54 | 87 | 100 | .180 | .125 |

*Scatter (m$^2$/g)

TABLE 4

ANIONIC SULFONATES AS DISPERSANTS FOR CATIONICALLY BULKED KAOLIN
Additions to "K" filter cake. pH = 4.0  6,500 ohm-cm
Aging tests at 140° F.

| Sample | 0.20% M148D | 0.20% M148D 0.05% DYQEX | 0.20% M148D 0.10% DYQEX | 0.20% M148D 0.05% LIGNOSITE 458 | 0.20% M148D 0.10% LIGNOSITE |
|---|---|---|---|---|---|
| Initial values. | | | | | |
| pH | 6.46 | 6.39 | 6.39 | 6.43 | 6.48 |
| Brookfield- | | | | | |
| 20 RPM | 72 | 72 | 56 | 74 | 54 |
| 100 RPM | 106 | 100 | 88 | 104 | 87 |
| Aged 6.8 days. (See note) | | | | | |
| pH | 5.90 | 5.76 | 5.69 | 5.84 | 5.72 |
| Brookfield- | | | | | |
| 20 RPM | 210+ | 62 | 56 | 60 | 56 |
| 100 RPM | 158 | 88 | 80 | 84 | 78 |
| Aged 11.5 days. | | | | | |
| pH | 6.00 | 5.86 | 5.79 | 5.79 | 5.80 |
| Brookfield- | | | | | |
| 20 RPM | 224+ | 70+ | 72+ | 68+ | 66+ |
| 100 RPM | 164 | 87 | 81 | 84 | 78 |

TABLE 4-continued

ANIONIC SULFONATES AS
DISPERSANTS FOR CATIONICALLY
BULKED KAOLIN
Additions to "K" filter cake. pH = 4.0 6,500 ohm-cm
Aging tests at 140° F.

| Sample | 0.20% M148D | 0.20% M148D 0.05% DYQEX | 0.20% M148D 0.10% DYQEX | 0.20% M148D 0.05% LIGNOSITE 458 | 0.20% M148D 0.10% LIGNOSITE |
|---|---|---|---|---|---|
| Aged 18.2 days. | | | | | |
| pH | 5.90 | 5.82 | 5.81 | 5.82 | 5.83 |
| Brookfield- | | | | | |
| 20 RPM | 150+ | 80+ | 70+ | 62+ | 62+ |
| 100 RPM | 126 | 89 | 81 | 82 | 78 |

Note:
After aging 6.8 days, the sample dispersed with M148D alone gave sufficient gel formation for a penetrometer reading (17.9 mm), the other samples showed no gel formation but some soft sediment.

TABLE 5

ANIONIC SULFONATES AS
DISPERSANTS FOR CATIONICALLY
BULKED KAOLIN
Filter cake, pH-4.3. res = 16,100 ohmxcm.
Aging at 140F. M148D added to pH of 7.5

| Days at 140° F. | Brookfield (cp.) 20 RPM | Brookfield (cp.) 100 RPM | pH | Therm. thick, °C. | Herc. dyne/RPM | Gel? | Observations Pour? | Sed.? |
|---|---|---|---|---|---|---|---|---|
| | | | | Control: 0.00% DYQEX | | | | |
| 0 | 75 | 77 | 7.5 | 82 | 8/1100 | no | yes | no |
| 1 | 142 | 134 | 7.1 | | 6/1100 | very slight | yes | very slight |
| 3 | 155 | 145 | 7.1 | | 6/1100 | slight | yes | slight (soft) |
| 7 | 160 | 152 | 7.1 | | 7/1100 | yes | yes | yes (hard) |
| | | | | + 0.05% DYQEX | | | | |
| 0 | 120 | 110 | 7.5 | 98 | 3/1100 | no | yes | no |
| 1 | 155 | 135 | 7.1 | | 2/1100 | very slight | yes | very slight |
| 3 | 135 | 131 | 7.1 | | 3/1100 | very slight | yes | slight |
| 7 | 145 | 134 | 7.1 | | 3/1100 | slight | yes | some (hard) |
| | | | | + 0.10% DYQEX | | | | |
| 0 | 90 | 86 | 7.5 | 95 | 2/1100 | no | yes | no |
| 1 | 120 | 113 | 7.1 | | 2/1100 | very slight | yes | no |
| 3 | 120 | 117 | 7.1 | | 2/1100 | very slight | yes | slight |
| 7 | 109 | 106 | 7.1 | | 5/1100 | very slight | yes | some (hard) |

TABLE 6

ANIONIC SULFONATES AS
DISPERSANTS FOR CATIONICALLY
BULKED KAOLIN
Additions to run K filter cake. pH 4.0
spec. res. = 6,500., ohmxcm aging at 140° F.

| Dispersant | pH | Brookfield 20 RPM | Brookfield 100 RPM | Thick temp, °C. | Black Glass* S457 | Black Glass* S577 |
|---|---|---|---|---|---|---|
| | | Initial test results. | | | | |
| 0.20% M148D | 6.3 | 116 | 135 | 54 | .195 | .144 |
| 0.25% M148D | 6.8 | 84 | 107 | 63 | .188 | .137 |
| 0.30% M148D | 7.4 | 120+ | 122 | 60 | .180 | .136 |
| 0.20% M148D + .05% LOMAR D | 6.4 | 68 | 96 | 100 | .176 | .125 |
| 0.20% M148D + .10% LOMAR D | 6.4 | 52 | 84 | 100 | .160 | .115 |
| | | Aged 4.8 days. | | | | |
| 0.20% M148D | 6.2 | 14000+ | | | | |
| 0.25% M148D | 6.6 | 3000+ | 1300+ | | | |
| 0.30% M148D | 7.0 | 1200+ | 650+ | | | |
| 0.20% M148D + .05% LOMAR D | 6.1 | 46 | 78 | | | |
| 0.20% M148D + .10% LOMAR D | 6.1 | 56 | 87 | | | |
| | | Aged 11.8 days. | | | | |
| 0.20% M148D | 6.1 | 640+ | 338 | | | |
| 0.25% M148D | 6.6 | 280+ | 220 | | | |
| 0.30% M148D | 7.0 | 240+ | 198 | | | |
| 0.20% M148D + .05% LOMAR D | 6.1 | 70 | 89 | | | |
| 0.20% M148D + .10% LOMAR D | 6.2 | 68 | 89 | | | |

At 11.8 days the three samples with M148D only were gelled sufficiently to give penetrometer readings. Both LOMAR D samples had 10 to 20% sediment but no gel formation.
*Scatter (m²/g)

TABLE 7

EFFECT OF DISPERSANT ON STORAGE STABILITY AT 140° F.

| Sample | Brookfield 20 rpm | 100 rpm | 14 days Unpourable Portion |
|---|---|---|---|
| Spray dry, run E (no added dispersant) | 450 | 220 | 72% |
| Filter cake, run N .15% M148D | 125 | 120 | 100% |
| Filter cake, run N .15% M148D, .06% KS | 137 | 770 | 95% |
| N Cake, 0.075% M148D and | | | |
| .025% LS, .025% NS | 140 | 105 | 61% |
| .025% LS, .05% NS | 100 | 90 | 10% |
| .025% LS, .05% NS, .06% KS | 80 | 90 | 10% |
| .075% LS, .075% NS | 100 | 92 | 10% |
| .10% LS, .10% NS | 140 | 105 | 20% |
| .10% LS, .10% NS, .06% KS | 185 | 122 | 10% |
| N cake, 0.10% M148D and | | | |
| .025% LS, .025% NS | 140 | 105 | 60% |
| .050% LS, .050% NS | 110 | 96 | 18% |
| .050% LS, .050% NS, .06% KS | 125 | 105 | 17% |
| .075% LS, .075% NS | 125 | 105 | 8% |
| .075% LS, .075% NS, .06% KS | 130 | 135 | 10% |
| .10% LS, .10% NS | 150 | 105 | 40% |
| N cake, 0.15% M148D and | | | |
| .025% LS, .025% NS | 190 | 120 | 50% |
| .050% LS, .050% NS | 125 | 100 | 18% |
| .075% LS, .075% NS | 130 | 105 | 10% |
| .075% LS, .075% NS, .06% KS | 130 | 110 | 10% |
| .10% LS, .10% NS | 140 | 105 | 10% |
| .10% LS, .10% NS, .06% KS | 125 | 100 | 8% |

NOTE
LS = (LIGNOSITE 458) Lignin sulfonate, NS = LOMAR D (Naphthalene Sulfonate) and KS = KELZAN S.

TABLE 8

PROPERTIES OF COATED SHEET PREPARED WITH SLURRIED BULKED PIGMENT

| | Filter Cake Adjusted Dispersant Combination | | | | All Spray Dried Dispersant Combination | | | | Slurried Samples* | |
|---|---|---|---|---|---|---|---|---|---|---|
| | 1 | 2 | 3 | 4 | 1 | 2 | 3 | 4 | Run E | NUCLAY/ANSILEX |
| MAYO 148D (wt. %) | 0.15 | 0.15 | 0.10 | .075 | 0.15 | 0.15 | 0.10 | .075 | 0.05 | |
| LS 458 (wt. %) | 0.05 | .075 | .075 | .075 | 0.05 | .075 | .075 | .075 | | |
| LOMAR D (wt. %) | 0.05 | .075 | .075 | .075 | 0.05 | .075 | .075 | .075 | | |
| Gloss | 47 | 48 | 48 | 49 | 46 | 49 | 48 | 49 | 52 | 49 |
| Brightness (%) | 76.7 | 76.5 | 76.6 | 76.6 | 76.6 | 76.5 | 76.5 | 76.5 | 76.4 | 76.6 |
| Opacity (%) | 86.4 | 86.1 | 86.4 | 86.3 | 86.4 | 86.4 | 86.7 | 86.2 | 86.3 | 86.0 |
| Heliotest (mm) | 84 | 80 | 82 | 85 | 85 | 84 | 85 | 86 | 82 | 76 |

*Control Samples

We claim:

1. A heat stabilized dispersed slurry of particles of chemically bulked hydrous kaolin clay pigment obtained by adding a water soluble cationic material to particles of hydrous kaolin clay in the presence of water to flocculate the particles of clay, the dispersant in said slurry comprising an effective amount of the combination of a water-soluble polyacrylate salt, a water-soluble lignosulfonate and a water-soluble naphthalene sulfonate formaldehyde complex to disperse the flocculated hydrous kaolin clay pigment wherein said slurry is free from a polyphosphate dispersant.

2. The slurry of claim 1 wherein said pigment is obtained by flocculating a suspension of kaolin with a cationic polyelectrolyte.

3. The slurry of claim 1 wherein said pigment is obtained by flocculating a suspension of kaolin clay with a polyamine.

4. The slurry of claim 1 wherein said heat stabilized slurry of bulked hydrous kaolin clay is at 60% solids or above.

5. A method for preparing a heat stable aqueous slurry of a bulking pigment suitable for use in coating or filling paper which comprises preparing a fluid aqueous suspension of particles of kaolin clay, adding thereto a water-soluble cationic polyelectrolyte, the amount of said cationic polyelectrolyte being sufficient to substantially thicken and flocculate said clay suspension, filtering the suspension to recover bulked clay, washing the filtered clay and adding as a dispersant an effective amount of a combination of a polyacrylate salt, an anionic water-soluble lignosulfonate and a water-soluble napthalene sulfonate formaldehyde complex to the recovered bulked clay to provide a fluid suspension of bulked clay wherein said fluid suspension of bulked clay is free from a phosphate dispersant.

6. The method as claimed in claim 5 wherein said lignosulfonate and said napthalene sulfonate is each present in amount in the range of about 0.05 to 0.15% by weight based on the dry weight of said clay including said cationic polyelectrolyte.

7. The method as claimed in claim 6 wherein said polyacrylate salt is present in amount in the range of about 0.05% to 0.20% based on the dry weight of the bulked clay.

8. The method of claim 7 wherein the amount of the combination of dispersant is such that said heat stabilized slurry has minimum Brookfield viscosity measured at 20 r.p.m.

9. The method of claim 5 including the additional step of spray drying said fluid suspension of bulked clay.

10. The spray dried product of claim 1.

UNITED STATES PATENT AND TRADEMARK OFFICE
CERTIFICATE OF CORRECTION

PATENT NO. : 4,772,332
DATED : September 20, 1988
INVENTOR(S) : Nemeh et al

It is certified that error appears in the above—identified patent and that said Letters Patent is hereby corrected as shown below:

Column 2, line 66, delete: ['dyne"], replace with: --"dyne"--.

Column 3, line 54, delete: [dispersed], replace with: --dispersed"--.

Column 6, line 19, delete: [be], replace with: --by--.

Column 6, line 28, delete: [withh], replace with: --with--.

Column 7, line 66, delete: [0.7micrometers], replace with --0.7 micrometers--.

Column 8, line 5, delete: [e.s.d], replace with: --e.s.d.--.

Column 8, line 14, delete: [e.s.d,], replace with: --e.s.d.,--.

Column 8, line 16, delete: [e.s.d,], replace with: --e.s.d.,--.

Column 8, line 36, delete: [than], replace with: --that--.

Column 11, line 2, delete: [(Fe$^+$)], replace with: --$Fe^{3+}$--.

Column 11, line 56, delete: [of hot was], replace with: --of a hot wash--.

UNITED STATES PATENT AND TRADEMARK OFFICE
CERTIFICATE OF CORRECTION

PATENT NO. : 4,772,332

DATED : September 20, 1988

INVENTOR(S) : Nemeh et al

It is certified that error appears in the above—identified patent and that said Letters Patent is hereby corrected as shown below:

Column 16, line 26 through 65, delete: [and listed as percent (%) of the original volume of slurry.

Typical procedures for preparing cationically bulked kaolin clays with polyamines and quaternary ammonium salts are described in U.S. Patents 4,075,030, 4,076,548 and 4,078,941, the teachings of which are incorporated by cross-reference. Specific examples of preparing cationically bulked clays with cationic polyelectrolytes such as CALGON 261 LV polymer are described in pending allowed U.S. application 06/861,943, filed May 12, 1986, the entire contents of which are incorporated herein by cross-reference.

Unless otherwise indicated, test evaluations described below were carried out with samples of kaolin clay from Georgia bulked with CALGON 261 LV.

In some cases the quantity of residual soluble salts remaining in the filter cake was varied. The following Example 1 is typical of the procedures used to prepare filter cakes of the bulked clay and spray dried products used in carrying out the other examples.

EXAMPLE 1

A high purity kaolin crude clay from a deposit in Washington County, Georgia, known as North Jenkins crude, was degritted, after dispersion at approximately 35% solids

UNITED STATES PATENT AND TRADEMARK OFFICE
CERTIFICATE OF CORRECTION

PATENT NO. : 4,772,332

DATED : September 20, 1988

INVENTOR(S) : Nemeh et al

Page 3 of 5

It is certified that error appears in the above—identified patent and that said Letters Patent is hereby corrected as shown below:

in water having dissolved therein sodium silicate having a $Na_2O/SiO_2$ weight ratio of about 3/1 and sodium carbonate. Approximately 1.5-2.0 lbs. of sodium silicate and 1.5-2.0 lbs. of carbonate were used per ton of dry clay. The suspension was then degritted and fractionated in a centrifuge to 87% finer than 2 micrometers. The median size of the fractionated suspensions was 0.59 ± 0.03 micrometers; weight percentage finer than 0.3 micrometers was 17%. Solids were about 20% and pH about 7. The suspension was then passed through a high intensity magnetic separator for purification. CALGON 261 LV polymer was added to the suspension of purified clay at the 0.08% level based on dry weight of clay. The polyelectrolyte was added as an aqueous solution of 0.5% (wt.) concentration.]

Column 17, line 37, insert: after [measured] and before [The], --and listed as percent (%) of the original volume of slurry.

Typical procedures for preparing cationically bulked kaolin clays with polyamines and quaternary ammonium salts are described in U.S. Patents 4,075,030, 4,076,548 and 4,078,941, the teachings of which are incorporated by cross-reference. Specific examples of preparing cationically bulked clays with cationic polyelectrolytes such as CALGON 261 LV polymer are described in pending allowed U.S. application 06/861,943, filed May 12, 1986, the entire contents of which are incorporated herein by cross-reference.

UNITED STATES PATENT AND TRADEMARK OFFICE
CERTIFICATE OF CORRECTION

PATENT NO. : 4,772,332

DATED : September 20, 1988

INVENTOR(S) : Nemeh et al

It is certified that error appears in the above—identified patent and that said Letters Patent is hereby corrected as shown below:

Unless otherwise indicated, test evaluations described below were carried out with samples of kaolin clay from Georgia bulked with CALGON 261 LV.

In some cases the quantity of residual soluble salts remaining in the filter cake was varied. The following Example 1 is typical of the procedures used to prepare filter cakes of the bulked clay and spray dried products used in carrying out the other examples.

EXAMPLE 1

A high purity kaolin crude clay from a deposit in Washington County, Georgia, known as North Jenkins crude, was degritted, after dispersion at approximately 35% solids in water having dissolved therein sodium silicate having a $Na_2O/SiO_2$ weight ratio of about 3/1 and sodium carbonate. Approximately 1.5-2.0 lbs. of sodium silicate and 1.5-2.0 lbs. of carbonate were used per ton of dry clay. The suspension was then degritted and fractionated in a centrifuge to 87% finer than 2 micrometers. The median size of the fractionated suspensions was 0.59 ± 0.03 micrometers; weight percentage finer than 0.3 micrometers was 17%. Solids were about 20% and pH about 7. The suspension was then passed through a high intensity magnetic separator for purification. CALGON 261 LV polymer was added to the

UNITED STATES PATENT AND TRADEMARK OFFICE
CERTIFICATE OF CORRECTION

PATENT NO. : 4,772,332

DATED : September 20, 1988

INVENTOR(S) : Nemeh et al

It is certified that error appears in the above—identified patent and that said Letters Patent is hereby corrected as shown below:

suspension of purified clay at the 0.08% level based on dry weight of clay. The polyelectrolyte was added as an aqueous solution of 0.5% (wt.) concentration.--

Column 22, line 8, delete: [cm)], replace with: --cm--.

Signed and Sealed this

Twentieth Day of June, 1989

Attest:

DONALD J. QUIGG

Attesting Officer

Commissioner of Patents and Trademarks